US010142277B2

(12) United States Patent
Couchon et al.

(10) Patent No.: US 10,142,277 B2
(45) Date of Patent: Nov. 27, 2018

(54) POSTING AND CONSULTATION OF MESSAGES BY USERS OF SOCIAL NETWORKS

(71) Applicant: Orange, Paris (FR)

(72) Inventors: David Couchon, Paris (FR); Olivier Godiniaux, Paris (FR); Anne Benrikhi, Clamart (FR); Jonathan Gourdin, Chantepie (FR)

(73) Assignee: ORANGE, Paris (FR)

( * ) Notice: Subject to any disclaimer, the term of this patent is extended or adjusted under 35 U.S.C. 154(b) by 509 days.

(21) Appl. No.: 14/317,431

(22) Filed: Jun. 27, 2014

(65) Prior Publication Data

US 2015/0006654 A1    Jan. 1, 2015

(30) Foreign Application Priority Data

Jun. 28, 2013  (FR) ..................................... 13 56286
Jun. 28, 2013  (FR) ..................................... 13 56295

(51) Int. Cl.
*G06F 15/16*     (2006.01)
*H04L 12/58*     (2006.01)

(52) U.S. Cl.
CPC ............. *H04L 51/32* (2013.01); *H04L 51/36* (2013.01)

(58) Field of Classification Search
CPC ..... G06Q 10/107; H04L 12/585; H04L 12/58; H04L 12/581

(Continued)

(56) References Cited

U.S. PATENT DOCUMENTS 8,767,948 B1 * 7/2014 Riahi .................. G06N 99/005
                                                        379/265.02
2008/0253363 A1 * 10/2008 Altberg ................. G06Q 30/02
                                                        370/352

(Continued)

FOREIGN PATENT DOCUMENTS

WO    2009050739 A2    4/2009
WO    2011051156 A1    5/2011

OTHER PUBLICATIONS

English translation of the Search Report and Written Opinion of the French Searching Authority dated Feb. 26, 2014 for corresponding French Patent Application No. 1356295 filed, Jun. 28, 2013.

(Continued)

*Primary Examiner* — Alan S Chou
(74) *Attorney, Agent, or Firm* — David D. Brush; Westman, Champlin & Koehler, P.A.

(57) ABSTRACT

A method is provided for posting a message originating from a social network user, called posting user, addressed to one or more users of a social network, called addressee users. The message is posted in a mailbox associated with a telephone line associated with a social network user identifier, assigned in the social network to the addressee user, dispatched with the message posting request. The addressee user receives a notification of the posting of the message, comprising a social network user identifier assigned to the posting user. The message addressee user consults the message from the mailbox. During the consultation of the message, social network user identifier assigned to the posting user is retrieved to the addressee user. A response message can be posted for each message posted or consulted.

23 Claims, 2 Drawing Sheets

(58) Field of Classification Search
USPC .......................................................... 709/206
See application file for complete search history.

(56) References Cited

U.S. PATENT DOCUMENTS

| | | | |
|---|---|---|---|
| 2011/0173268 A1 | 7/2011 | Cai et al. | |
| 2013/0157626 A1* | 6/2013 | Talwar .................... | H04W 4/14 455/413 |
| 2013/0297687 A1* | 11/2013 | Speeney ............ | G06Q 30/0241 709/204 |
| 2014/0195626 A1* | 7/2014 | Ruff ...................... | H04L 63/104 709/206 |

OTHER PUBLICATIONS

French Search Report dated Feb. 25, 2014 for corresponding French Patent Application No. 1356286, filed Jun. 28, 2013.
French Search Report dated Feb. 26, 2014 for corresponding French Patent Application No. 1356295 filed, Jun. 28, 2013.

* cited by examiner

POSTING AND CONSULTATION OF MESSAGES BY USERS OF SOCIAL NETWORKS

CROSS-REFERENCE TO RELATED APPLICATIONS

The present application claims priority from French patent application n° FR 13 56295 filed on Jun. 28, 2013 and French patent application n° FR 13 56286 filed on Jun. 28, 2013, the contents of which are hereby incorporated by reference in their entireties.

TECHNICAL FIELD

The present invention relates both to the field of social networks, accessible for example via the computing network of Internet type, and to multimedia messaging services.

STATE OF THE ART

Social networks on the Internet network allow users thereof to set up groups of contacts, consisting for example of friends, members of the family, people sharing the same interests or of business acquaintances, etc. For this purpose, they provide their users with services and tools for exchanging content and information, such as for example photos, states of presence, topical information, etc. These exchange services are accessible via suitable user interfaces.

Among these exchange services, there exist various services for transmitting one or more messages addressed to one or more users of the social network. These messages are accessible and consultable via a Web page of the social network. In the case of a "public" message, the message is consultable by users other than the message addressee user, via a page, sometimes called the "wall" of the message addressee user, associated with this user. In the case of a "private" message, the message will be consultable only by the message addressee user, in a Web page displaying his private messages.

In both cases, in order to post and/or consult such messages, it is necessary to have access to the computing network underlying this social network (the Internet network, in general) or indeed to previously have created a user account with the social network for the posting and/or consultation of "private" messages. This represents a constraint for users and restricts access to the service for posting and/or for consulting messages solely to duly equipped users and/or solely to times when suitable equipment is available to these users.

SUMMARY

The invention offers a solution which remedies all or some of the drawbacks of the prior art.

According to a first aspect, the invention relates to a method of requesting message posting and correlatively, to a method of processing a message posting request, a network entity implementing the method of processing a message posting request and a terminal implementing the method of requesting message posting.

The method of processing a message posting request originating from a social network user, called posting user, comprises a step of receiving a request for posting of a message intended for at least one social network user, called addressee user, and a social network user identifier for each addressee user, a step of identifying at least one telephone line associated with a social network user identifier of an addressee user, a step of posting said message in a mailbox associated with the telephone line identified and a step of dispatching a notification of posting of said message addressed to at least one terminal associated with the telephone line identified, the notification comprising a social network user identifier assigned to the posting user.

Correlatively, the method of requesting message posting, originating from a social network user, called posting user, comprises a step of dispatching a request for posting of a message intended for at least one social network user, called addressee user, and a social network user identifier for each addressee user, the dispatching of said request triggering a posting of said message in a mailbox associated with a telephone line, an identification of which is stored in association with a social network user identifier of an addressee user, and a dispatching of a notification of posting of said message addressed to at least one terminal associated with the telephone line, the notification comprising a social network user identifier assigned to the posting user.

A network entity implements the method of processing the message posting request. This network entity comprises:

a module for receiving a request for posting of a first message, originating from a social network user, called posting user, intended for at least one social network user, called addressee user, and a social network user identifier for each addressee user, a module for identifying at least one telephone line associated with a social network user identifier of an addressee user, a module for posting said first message in a first-messaging mailbox associated with the telephone line identified and a module for dispatching a notification of posting of said first message addressed to at least one terminal associated with the telephone line identified, the notification comprising a social network user identifier assigned to the posting user.

A terminal communicates with this network entity to dispatch the message posting request. This terminal comprises a module for dispatching a request for posting of a message, originating from a social network user, called posting user, intended for at least one social network user, called addressee user and a social network user identifier for each addressee user, said dispatching triggering a posting of said message in a mailbox associated with a telephone line, an identification of which is stored in association with a social network user identifier of an addressee user, and a dispatching of a notification of posting of said message addressed to at least one terminal associated with the telephone line, the notification comprising a social network user identifier assigned to the posting user.

The invention allows message posting between users of social networks by passing through a mailbox of a telephone line, doing so without the users needing to share their telephone line identifications beforehand. Only the social network identifiers of the various users are required in order to perform this message posting.

Indeed, it is the social network identifier of the addressee user that is used to search for a telephone line identification. Likewise, during notification of the message posting, it is the social network user identifier of the posting user that is used, and not necessarily the identification of his telephone line, as is customarily the case for message postings in telephone line mailboxes.

The message addressee user therefore no longer needs to connect to the social network in order to be able to receive messages from the users with whom he has a relationship in the social network. He can consult these messages directly in his mailbox, doing so while benefiting from a user identification logic which is that of the social network. Thus he compounds the possibilities afforded to him by the social network as regards setting up a relationship with other users and the possibilities of a messaging system, such as offered by telephone line operators, as regards ease of access and consultation.

Concerning the relationship existing in the social network between the posting user and the addressee user or users, various embodiments are possible.

In one embodiment of the method of processing or of request of posting, the posting user's social network user identifier is an identifier under which the posting user is known to the addressee user in the social network and/or the addressee user's social network user identifier is an identifier under which the addressee user is known to the posting user in the social network.

In one embodiment of the method of processing or of request of posting, the posting user's social network user identifier is an identifier, for example a pseudonym, not disclosing the real identity of the posting user and/or the addressee user's social network user identifier is an identifier, for example a pseudonym, not disclosing the real identity of the addressee user.

In one embodiment of the method of processing or of request of posting, the identification of the telephone line is declared by the addressee user in social network user profile data of this addressee user that are not accessible to the posting user through the social network.

Thus, entirely anonymized message posting can take place between a posting user and one or more addressees: the real identity of the users is never disclosed, only the identifiers of users of social networks being transmitted during message posting and subsequent notification thereof.

Concerning the storage of the message, various data are able to be stored in association with the message.

In one embodiment, the processing method comprises a step of storing, in association with the posted message, a social network user identifier of the posting user and of the addressee user or users. The social network user identifiers stored with the message make it possible to perform a notification of the message posting or a consultation of the message In one embodiment, the processing method comprises a step of storing, in association with the posted message, a telephone line identification in respect of the posting user and of the addressee user or users. These identifications of telephone lines serve to post a response message in response to a posted message or to post a response message in response to a response message.

Concerning the construction of the message posting request, various embodiments are possible.

In one embodiment of the processing method, the message posting request is received by a message posting request service which is integrated into a service of the social network to which the posting user and the addressee user belong.

In one embodiment of the processing method, the message posting request is received by a message posting request service which is integrated into a message posting service of a telephone network.

In one embodiment, the processing method comprises a step of presenting to the posting user a list of social network users from among whom at least one addressee user has to be selected, said list being constructed on the basis of a list of users linked with the posting user in a social network.

The message posting service can therefore be made available to users either in the social network, or as extra service of a telephone network.

Concerning the identification of the telephone line, various embodiments are possible.

In one embodiment of the processing method, the telephone line identified is a telephone line of a addressee user, of which an identification has been stored in association with a social network user identifier assigned to this addressee user. To be able to benefit from the service, it thus suffices for the social network user to declare a telephone line, for example in his social network user profile.

In one embodiment of the processing method, the telephone line identified is a telephone line selected from among several telephone lines of a addressee user as a function of a criterion relating to the link in the social network between the posting user and the addressee user concerned.

In one embodiment of the processing method, the telephone line identified is a telephone line selected from among several telephone lines of a addressee user as a function of a criterion relating to the message posting user and/or to the message addressee user.

It is thus possible to favor the use of one mailbox rather than another according to the link existing in the social network.

According to a second aspect, the invention relates to a method of requesting response message posting and correlatively, to a method of processing a response message posting request, a network entity implementing the method of processing a response message posting request and a terminal implementing the method of requesting response message posting.

The response message is posted in response to an earlier message, called first message, originating from a social network user, called posting user, addressed to a social network user, called addressee user, posted in a mailbox of a telephone line by means of a method, of a network entity and/or of a terminal according to the first aspect of the invention.

The method of processing a request for posting of a response message comprises:
 a step of receiving a request for posting of a second message, in response to the first message,
 a step of identifying at least one second telephone line associated with the social network user identifier assigned to the user posting the first message,
 a step of triggering, for at least one second identified telephone line, a posting of said second message in a mailbox associated with the second identified telephone line and a dispatching of a notification of posting of said second message addressed to at least one terminal associated with the second identified telephone line, the notification comprising a social network user identifier assigned to the user who requested the posting of the second message.

The method of requesting posting of a response message comprises,
 a step of dispatching a request for posting of a second message, in response to the first message, said request for posting triggering, for a second telephone line associated with the social network user identifier assigned to the user posting the first message, a posting of the second message in a mailbox associated with the second telephone line and a dispatching of a notification of posting of the second message addressed to at least one terminal associated with the second telephone line, the notification comprising a social network user identifier assigned to the user who requested the posting of the second message.

A network entity implements the method of processing the response message posting request. This network entity comprises:
- a module for receiving a request for posting of a second message, in response to the first message,
- a module for identifying at least one second telephone line associated with the social network user identifier assigned to the user posting the first message,
- a module for triggering, for at least one second identified telephone line, a posting of said second message in a mailbox associated with the second identified telephone line and a dispatching of a notification of posting of said second message addressed to at least one terminal associated with the second identified telephone line, the notification comprising a social network user identifier assigned to the user who requested the posting of the second message.

A terminal communicates with this network entity to dispatch the response message posting request. This terminal comprises a module for dispatching a request for posting of a second message, in response to the first message, said request for posting triggering, for a second telephone line associated with the social network user identifier assigned to the user posting the first message, a posting of the second message in a mailbox associated with the second telephone line and a dispatching of a notification of posting of the second message addressed to at least one terminal associated with the second telephone line, the notification comprising a social network user identifier assigned to the user who requested the posting of the second message.

The invention thus allows the implementation of a response mechanism for responding to a message posted in a mailbox of a telephone line by means of a method, of a network entity and/or of a terminal according to a first aspect of the invention. The identifiers of users of social networks are once again used to undertake this time the identification of the telephone line of the response message addressee user and to notify this addressee user, in particular about the user that requested the posting of the response message.

The invention thus allows a posting of message and response between users of social networks by passing through a mailbox, doing so without the users needing to share their telephone line identifications beforehand. Only the social network identifiers of the various users are required in order to perform this message posting.

According to one embodiment, the method of processing a response message posting request comprises
- a step of receiving a request for posting of a third message, in response to the second message,
- a step of identifying at least one third telephone line associated with the social network user identifier assigned to the user posting the second message,
- a step of triggering, for at least one third identified telephone line, a posting of said third message in a mailbox associated with the third identified telephone line and a dispatching of a notification of posting of said third message addressed to at least one terminal associated with the third identified telephone line, the notification comprising a social network user identifier assigned to the user who requested the posting of the third message.

Thus a response message can be posted in response to a response message. And so on and so forth in a recursive manner.

According to a third aspect, the invention relates to a method of requesting message consultation and correlatively, to a method of processing a message consultation request, a network entity implementing the method of processing a message consultation request and a terminal implementing the method of requesting message consultation.

The message consulted is a message, posted on request of a social network user, called posting user, addressed to a social network user, called addressee user, in a mailbox of a telephone line by means of a method, of a network entity and/or of a terminal according to the first aspect of the invention.

The method of processing a message consultation request comprises:
- a step of receiving, originating from a terminal, a request for consultation of a message posted on request of a social network user, called posting user, in a mailbox of a telephone line by means of a method, of a network entity and/or of a terminal according to the first aspect of the invention,
- for at least one first message posted in said mailbox, a step of dispatching to said terminal a social network user identifier of the user posting the first message and at least a part of the content of the first message, said dispatching triggering a rendering by the terminal of said social network user identifier and of the part of the content.

The consultation request method comprises:
- a step of dispatching a request for consultation of at least one message posted on request of a social network user, called posting user, in a mailbox of a telephone line by means of a method, of a network entity and/or of a terminal according to the first aspect of the invention;
- for at least one first message posted on request of a user of a social network, called posting user, a step of reception and rendering, by the terminal, of a social network user identifier assigned to the posting user in a social network and of at least a part of the content of the first message.

A network entity implements the method of processing the response message consultation request. This network entity comprises:
- a reception module for receiving, originating from a terminal, a request for consultation of a message posted on request of a social network user, called posting user, in a mailbox of a telephone line by means of a method, of a network entity and/or of a terminal according to the first aspect of the invention,
- a dispatch module for dispatching to said terminal, for at least one first message posted in said mailbox, a social network user identifier of the user posting the first message and at least a part of the content of the first message, said dispatching triggering a rendering by the terminal of said social network user identifier and of the part of the content.

A terminal communicates with this network entity to dispatch the message consultation request. This terminal comprises a module for dispatching a request for consultation of at least one message posted on request of a social network user, called posting user, in a mailbox of a telephone line by means of a method, of a network entity and/or of a terminal according to the first aspect of the invention;

a reception and rendering module for receiving and retrieving a social network user identifier assigned to the posting user in a social network and at least a part of the content of the first message.

According to one embodiment, the method of processing a message consultation request comprises a step of identifying at least one message posted in said mailbox by a posting user of which a social network user identifier is provided by the consulting user and a step for prompting the consulting user to consult the message or messages identified.

According to one embodiment, the method of processing a message consultation request comprises a step of identifying at least one message posted in said mailbox addressed to an addressee user of which a social network user identifier is indicated by the consulting user and a step consisting in prompting the consulting user to consult the message or messages identified.

According to a fourth aspect, the invention relates to a method of consultation of a message and correlatively, a method of processing a message consultation request, a network entity implementing the method of processing a message consultation request and a terminal implementing the method of message consultation. The user originating the message consultation request is a social network user, here called the consulting user. The user who requested the posting of the message is also a social network user, here called the posting user.

The method of consultation comprises:
a step of dispatching a consultation request in respect of at least one message posted on request of a user of a social network, called posting user, in a mailbox of a telephone line of which an identification is stored in association with a social network user identifier of a social network user, called consulting user, for at least one first posted message, a step of reception and rendering, by the terminal, of a social network user identifier assigned to the posting user in a social network and of at least a part of the content of the first message.

The method of processing a message consultation request comprises:
a step of receiving, originating from a terminal, a consultation request in respect of at least one message posted on request of a user of a social network, called posting user, in a mailbox of a telephone line of which an identification is stored in association with a social network user identifier of a social network user, called consulting user, for at least one first message posted in the said mailbox, a step of dispatching to the said terminal of a social network user identifier of the user posting the first message and of at least a part of the content of the first message, the said dispatching triggering a rendering by the terminal of the said social network user identifier and of the part of the content.

A network entity implements the method of processing the message consultation request. This network entity comprises:
a reception module for receiving, originating from a terminal, a consultation request in respect of at least one message posted on request of a user of a social network, called posting user, in a mailbox of a telephone line of which an identification is stored in association with a social network user identifier of a social network user, called consulting user, a dispatch module for dispatching to the said terminal a social network user identifier of the user posting the first message and at least a part of the content of the first message, a dispatch triggering a rendering by the terminal of the said social network user identifier and of the part of the content.

A terminal communicates with this network entity to dispatch the message consultation request. This terminal comprises
a module for dispatching a consultation request in respect of at least one message posted on request of a user of a social network, called posting user, in a mailbox of a telephone line of which an identification is stored in association with a social network user identifier of a social network user, called consulting user, a module for reception and rendering, by the terminal, of a social network user identifier assigned to the posting user in a social network and of at least a part of the content of the first message.

The invention allows a message consultation between users of social networks by passing through a mailbox of a telephone line, doing so without the users needing to share their telephone line identifications beforehand. Only the social network identifiers of the various users are required in order to implement such a message consultation.

Indeed, during the consultation of the message, it is the social network user identifier of the posting user that is used, and not necessarily the identification of his telephone line, as is customarily the case for messages posted in telephone line mailboxes. Furthermore, it is the social network identifier of the consulting user that serves to identify the telephone line whose mailbox will serve for the posting of the message.

The message addressee user therefore no longer needs to connect to the social network in order to be able to receive messages from the users with whom he has a relationship in the social network. He can consult these messages directly in his mailbox, doing so while benefiting from a user identification logic which is that of the social network. Thus he compounds the possibilities afforded to him by the social network as regards setting up a relationship with other users and the possibilities of a messaging system, such as offered by telephone line operators, as regard ease of access and consultation.

In the case where the first message has been posted for several addressees, a particular embodiment of the method of consultation is envisaged.

In this embodiment, in which the first message having been posted also in a mailbox of another telephone line of which an identification is stored in association with a social network user identifier of a social network user, called addressee user, the method comprises a step of reception and rendering by the terminal of a social network user identifier of the addressee user.

In the case where several messages are posted in the mailbox, several embodiments are possible.

In one embodiment, the message consultation request is aimed at the consultation of a plurality of messages to be retrieved successively according to an order specified by the consulting user, and the method comprises, for each message of the said plurality of messages processed in accordance with the specified order, a step of reception and rendering by the terminal of a social network user identifier of the user posting this message and of at least a part of the content of this message.

In one embodiment, a message posted in the said mailbox is stored in association with a social network user identifier of the posting user and with a social network user identifier of at least one user who is an addressee of this message.

In one embodiment, the method comprises a step of identifying at least one message posted in the said mailbox by a posting user of which a social network user identifier is indicated by the consulting user.

In one embodiment, the method comprises a step of identifying at least one message posted in the said mailbox addressed to an addressee user of which a social network user identifier is indicated by the consulting user.

Thus the selection of the messages which will be consulted can be made on the basis of user identifier of social networks which are stored in association with the posted messages. This is particularly convenient for the consulting user and furthermore makes it possible to avoid having to communicate information other than the identifiers of users of social networks of the users concerned in a consulted message. Anonymity can thus be safeguarded in so far as these identifiers of users of social networks can be pseudonyms not disclosing the real identity of the users.

Each device according to the invention (network entity or terminal) is designed to implement one or more of the first, second, third and fourth aspects of the invention.

Furthermore, the various embodiments which have been presented in respect of the methods or devices are mutually combinable for the implementation of the first, second, third and/or fourth aspects of the invention.

According to a preferred implementation, the various steps of a method according to the first, second, third and/or fourth aspect of the invention are implemented by computer program or software.

The invention thus relates to a program or software, able to be executed by a computer or by a data processor, this program/software comprising instructions for controlling the execution of the steps of a method according to the first, second, third and/or fourth aspect of the invention. These instructions are intended to be stored in a memory of a computing device, loaded and then executed by a processor of this computing device.

This program/software can use any programming language, and be in the form of source code, object code, or of code intermediate between source code and object code, such as in a partially compiled form, or in any other desirable form.

The computing device can be implemented by one or more physically distinct machines and exhibit, overall, the architecture of a computer, including at least some of the constituents of such an architecture: data memory (memories), processor(s), communication bus, hardware interface(s) for connecting this computing device to a network or another item of equipment, user interface(s), etc.

The computing device (network entity or terminal) which implements the various steps of a method according to the first second, third and/or fourth aspect of the invention is thus furnished with the following means:
- storage means, in particular a memory, for the storage of program instructions designed to control the execution of the steps of the method concerned
- data processing means, in particular a data processor, able to execute the program instructions stored so as to implement the steps of the method concerned.

This computing device (network entity or terminal) which implements the various steps of a method according to the first, second, third and/or fourth aspect furthermore comprises means for implementing the various steps of the various embodiments of these methods. These means are software modules and/or hardware modules.

In this respect, the term "module" corresponds in this document to a software component, to a hardware component or else to a set of hardware and/or software components, able to implement a function or a set of functions, according to what is described hereinbelow for the module concerned.

The invention also relates to an information medium readable by a data processor, and comprising instructions of one of the programs mentioned hereinabove. The information medium can be any entity capable of storing such a program.

BRIEF DESCRIPTION OF THE DRAWINGS

The invention will be better understood on reading the description which follows, given by way of example and made with reference to the appended drawings.

DETAILED DESCRIPTION OF ILLUSTRATIVE EMBODIMENTS

In this document, the term 'social network' is aimed at any type of social network implemented via a telecommunication network, for example via the Internet network. Such a social network groups together communities of people who exchange through a communication infrastructure, implemented by one or more computing servers, for example by one or more Web servers. The people establish or declare links between themselves, on the basis of various criteria, such as for example personal affinities, or else closeness of career paths, or else similar centers of interest, etc. The social network based on Facebook®, Twitter®, Viadeo®, LinkedIn®, etc may be cited by way of example.

By "terminal" is meant any communication device furnished with a user interface and able to establish a communication through a telecommunication network.

In the subsequent description, the following concepts will be used a "posting user" is a user who formulates/initiates a request for posting of a message;

an "addressee user" is a user for whom a message posted by a posting user is intended; there may be one or more addressee users for one and the same message;

a "consulting user" is a user who formulates/initiates a request for consultation of a message: this may be a user posting this message or a user who is an addressee of this message.

Figure 1:
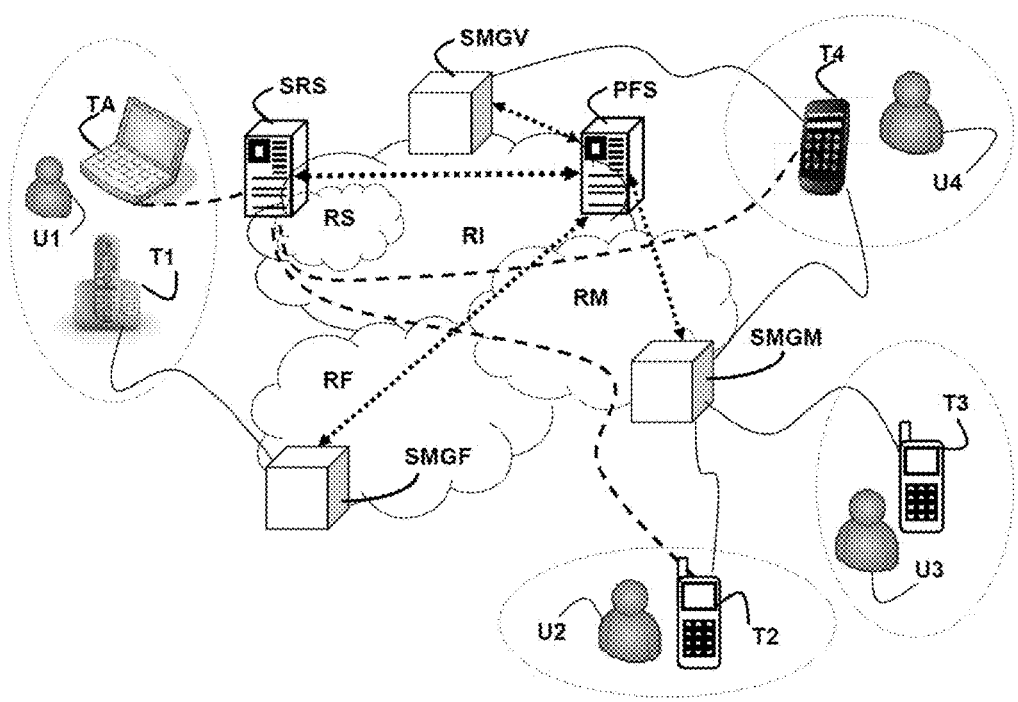
FIG. 1 represents a communication system according to an embodiment of the present invention.

FIG. 1—Communication System

FIG. 1 represents in a schematic manner a communication system SYS according to an embodiment of the present invention.

This communication system SYS hinges around several telecommunication networks, interconnected with one another:

an wide area network RI, (WAN, Wide Area Network), for example the Internet network;

a mobile telephone network RM, for example a network complying with a GSM (Global System for Mobiles), UMTS (Universal Mobile Telecommunications System), LTE (Long Term Evolution) standard etc; this network is interconnected with the Internet network RI in such a way that compatible terminals (3G or 4G terminals in particular) with Internet access can access this Internet network RI by passing through the mobile network RM;

a fixed telephone network RF, for example a switched telephone network (STN).

a voice over IP telephone network RV (VoIP, Voice over IP), using or not the technical infrastructures of the networks RI and RM.

This communication system furthermore comprises:

A social network server SRS, accessible through the Internet network RI, for management, access to a social network RS and implementation of the communications within this social network RS;

A messaging platform PFS associated with the social network RS, offering a message posting service accessible through the Internet network RI, accessible in particular by any terminal connected to the Internet network RI;

A messaging server SMGM for the mobile network RM, accessible from a terminal connected to the mobile network RM;

A messaging server SMGF for the fixed network RF, accessible from a terminal connected to the fixed network RF.

A messaging server SMGV for the VoIP network RV, accessible from a terminal connected to the VoIP network RV;

A plurality of communication terminals, T1, T2, T3, T4 used respectively by users U1, U2, U3, U4.

It is assumed here that the users U1, U2, U3, U4 are all users of the social network RS: each of these users has a user account, registered with the social network server SRS. Furthermore, the user U1 has a terminal TA, of personal computer (PC) type for accessing the Internet network RI and the social network RS.

The Terminals T1, T2, T3, T4

Each of the communication terminals T1, T2, T3, T4 is associated with at least one telephone line, referenced respectively L1, L2, L3, L4. Here, "telephone line" is understood to mean any telecommunication line suitable for the establishment of a communication, whether this communication be audiophonic and/or videophonic and/or textual, established via a mobile and/or fixed communication network, established in packet mode or in circuit mode, etc.

By way of purely illustrative example, it is assumed that:

the terminal T1 is a fixed telephone hooked up to the fixed network RF, associated with a fixed telephone line L1, cabled, identified by a fixed telephone number: the terminal T1 is designed to establish a telephone communication in circuit mode through the fixed network RF;

the terminal T2 is a mobile telephone hooked up to the mobile network RM in circuit mode, associated with a mobile telephone line L2, identified by a mobile telephone number, (in general, this number is an MSISDN number): the terminal T2 is designed to establish a telephone communication in circuit mode through the mobile network RM;

the terminal T3 is a mobile telephone hooked up to the mobile network RM in circuit mode, associated with a mobile telephone line L3, identified by a mobile telephone number, (in general, this number is an MSISDN number): the terminal T3 is designed to establish a telephone communication in circuit mode through the mobile network RM;

the terminal T4 is a mobile telephone hooked up to the mobile network RM in circuit mode, associated with a mobile telephone line L4, identified by a mobile telephone number (in general, this number is an MSISDN number, Mobile Station International Subscriber Directory Number): the terminal T4 is designed to establish a telephone communication in circuit mode through the mobile network RM; the terminal T4 is furthermore a bi-mode telephone, furnished with a Wi-fi interface and associated with a VoIP telephone line, capable of establishing a packet mode Voice over IP (VoIP, Voice over IP) telephone communication through the Internet network, through the mobile network RM and/or through Wi-fi cells for accessing one of these two networks.

The Network Messaging Servers SMGF, SMGM, SMGV

A messaging service is offered in the fixed network RF. This messaging service is for example a network messaging service. The messages and mailboxes of the various telephone lines of the fixed network are managed and stored by the messaging server SMGF. The messages managed by this messaging service are usually audio messages, or indeed text, these latter being consultable in vocalized form. The messages posted are consultable by a user by establishing, by means of a terminal associated with the telephone line, a telephone link with the message server SMGF. The content of the message is then transmitted to the terminal in the form of a telephonic audio stream.

As an alternative, the messages and the mailbox of a telephone line of the fixed network RF can be managed and stored by a fixed telephone answering facility, linked to the telephone line and located for example in the residence of the user subscribing to this telephone line.

A messaging service is also offered in the mobile network RM. This messaging service is for example a network messaging service. The messages and mailboxes of the various telephone lines of the fixed network are managed and stored by the messaging server SMGM. The messages managed by this messaging service are audio, text and/or video messages. Here also, the messages posted are consultable by a user by establishing, by means of a terminal associated with the telephone line, a telephone link with the messaging server SMGF. The content of the message is then transmitted to the terminal in the form of a telephonic audio stream.

A messaging service is also offered in the VoIP network RV. This messaging service is for example a network messaging service: the messages and mailboxes of the various telephone lines of the fixed network being managed and stored by the messaging server SMGV. The messages managed by this messaging service are audio, text, and/or video messages.

For the implementation of the message consultation method, each of the messaging servers SMGF, SMGM, SMGV is in charge of the reception and processing of a message consultation request, of the transmission of the information associated with this message and of the reception and processing of a possible request for response to a consulted message.

The Social Network Server SRS

The social network server SRS implements a social network service for one or more social networks. In the example described here, the social network is accessible through the Internet network RI: a user connects to this social network by loading onto his terminal a Web page, corresponding to a given URL address, forming part of the Web domain of the social network.

The social network server SRS behaves like any Web server: it transmits a Web page to each terminal subsequent to a Web query sent by this terminal to this server.

The social network server SRS is in particular in charge of controlling access to the social network. In particular, the social network server SRS controls access to the social network on the basis of authentication data input by the user into a Web page. The data for authenticating a user comprise a social network user identifier (for example, an email address of this user), and at least one item of data for authenticating the user (for example a password associated with his email address): these authenticating data are stored by the social network server SRS.

In practice, any type of identifier which makes it possible to identify unequivocally a user account of a person using a social network is usable for the implementation of the invention. In general, this is a reference defined by the user at the moment of the creation of his user account. This reference can be an email address, a string of characters and/or an image, photo, etc. It is assumed in the subsequent description that the users U1, U2, U3 and U4 use respectively social network user identifiers denoted id1, id2, id3 and id4.

Each social network user furthermore defines at least one pseudonym, or assumed identifier, under which this user will be known in the social network by the other users with whom this user enters into communication through the social network. This pseudonym can be a string of alphanumeric characters and/or an image, a photo, etc. This pseudonym is a social network user identifier usable for the implementation of the various methods described in this document.

The advantage related to the use of this pseudonym is that it renders anonymous the exchanges of this user with the other users of the social network: the genuine identity of the user is not deducible from this pseudonym alone. Likewise, the email address of this user or his telephone number, or more generally his telephone or mailing details or electronic addresses, are not deducible from this pseudonym alone.

Hereinafter in this document, we will therefore speak, in relation to this pseudonym, of social network user anonymized identifier.

It is assumed that the users U1, U2, U3 and U4 use the pseudonyms idps1, idps2, idps3 and idps4 respectively.

In contradistinction to the identifiers id1, id2, id3, id4 which are unique—in the sense that just a single user account is identified by one of these identifiers—the pseudonyms may not be unique within a given social network: it is sometimes possible that a pseudonym may be used by several users. The distinction between the various users with the same pseudonym can be made for example on the basis of an image (photo) or of information that they publish about themselves in association with their pseudonym.

The social network server SRS is also in charge of storing, in an associated database DB, the profile data and other parameters associated with the users registered with the social network service. The profile data include public data and private data: the public data made available to other users who come into contact with this user, so as to inform these other users about the personality of the user, his business profile or his tastes, etc, whereas the private data are neither transmitted nor accessible by another user of the social network. The private data are however used by the social network server SRS for the implementation of various services.

Among the private data, the social network server SRS stores in particular for each user who so wishes, a telephone line identification to be used for the message posting addressed to this user. This telephone line identification must be present for each user who is the addressee of a message, and preferably, for each user posting a message, so as to allow a user who is the addressee of a message originating from this posting user to request the posting of a message of response to this message.

The Messaging Platform PFS

The messaging platform PFS associated with the social network RS is accessible through the Internet network RI, by a terminal or server connected to the Internet network RI. This messaging platform PFS implements a service for recording and posting messages.

In the case where the user posting the message and/or the user who is the addressee of this message remains anonymous because he is identified during message consultation or posting by a pseudonym not disclosing his real identity, the service implemented by the messaging platform PFS is a service for posting anonymized messages. These messages will thus also be anonymized during their consultation. The user posting the message and/or the user who is the addressee of this message is in this case known to the other users solely by a social network user anonymized identifier, in particular by his pseudonym. In particular, the identification of the telephone line of an addressee or posting user is never disclosed to the other users with whom he exchanges messages by means of one of the methods described in this document.

For the implementation of the method of processing a message posting request (whether for an initial message, or indeed for a response message to an initial/earlier message posted by way of this messaging platform PFS), the messaging platform PFS is in charge of the reception and processing of a message posting request, of the recording of the message and information associated with this message and the control of the various messaging servers SMGF, SMGM, SMGV which will perform the posting of the message in one or more mailboxes.

Figure 2:
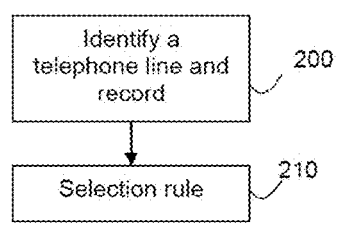
FIG. 2 is a simplified flowchart of an embodiment of an initial configuration phase, prior to the implementation of the message posting method or of the response message posting method.

FIG. 2—Configuration of the User Profile

Identification of the Telephone Line—Step 200

Within the framework of the implementation of the invention, the social network server SRS is designed to store (step 200), in the database DB, in the stored private data for a user, in association with an identifier of a user in the social network, an identification of at least one telephone line. This telephone line identification is usable to post, in the mailbox associated with this telephone line, a message addressed to this user. The telephone line identification forming part of the private data of a given user, it is not known to the users that come into contact with him through the social network. These private data constitute a subset of his user profile; a "private" profile of the user, as it were.

Each user of the social network can declare, by means of a terminal connected to the Internet network RI, an identification of one or more telephone lines to be stored in the private data of his social network user profile.

With this aim, a Web page accessible in the social network RS and provided by the social network server SRS is loaded by a Web browser executed by the terminal. The user then inputs (step 200) the identification of the telephone line and requests the recording of this identification in the private data of his social network user profile.

Each entered telephone line identification is then transmitted during step 200 by the user's terminal to the social network server SRS, so as to be stored in the database DB associated with this social network server SRS.

Such a telephone line identifier can be an identifier associated with a communication terminal in a communication network which this terminal accesses. This identifier serves to identify the communication terminal in the communication network considered during the establishment of a communication with this communication terminal. Such an identifier can be a telephone number in a mobile or fixed telephone network, or else an IP address in a Voice over IP network.

In certain cases, a telephone line identifier can be associated with several communication terminals. This is the case in particular for terminals which are connected to a domestic gateway of a domestic network and which are all to be declared in such a way as to receive a call sent to one and the same telephone number. In this case, the gateway is able to notify a telephone call that it receives to any one of the terminals thus declared.

It is assumed in the subsequent description that the users U1, U2, U3 and U4 have each provided at least one telephone line identification, associated with their social network user identifier idps1, idps2, idps3 and idps4 and/or id1, id2, id3, id4: the identification of these telephone lines are denoted idcom1, idcom2, idcom3 and idcom4. It is furthermore assumed that the user U4 has provided the social network server SRS with a second of telephone line denoted idcom4bis.

Rule for Selecting a Telephone Line—Step 210

When several telecommunication lines are defined for one and the same social network user identifier, the social network server SRS selects a telephone line as a function of at least one selection criterion. The social network server SRS is also designed to store (step 210), in a database DB associated with this server, in the private data of the profile of a social network user, in association with an identifier of a user in the social network, a telephone line selection rule defined on the basis of one or more selection criteria.

A first exemplary selection criterion is a criterion defined relative to at least one timeslot: depending on the timeslot during which a message posting request is received, this will be a particular telephone line which will be chosen, or else another telephone line. For example, for message posting requests arriving at the weekend, the private telephone line will be selected, while for the other requests, the business telephone line will be selected.

A second exemplary selection criterion is a criterion defined relative to the existing link in the social network between the user posting a message and the user who is the addressee of this message. For example, if the relationship between these two users is of a business nature, then the telephone line chosen will be a telephone line for business use. On the other hand, if the two users are declared as friends in the social network then it is the telephone line for private use that will be chosen.

By generalizing, each user having provided an identification of several telephone lines to be used for message posting can thus define at least one criterion for selecting a telephone line.

With this aim, a Web page accessible in the social network RS and provided by the social network server SRS is loaded by a Web browser executed by the terminal of the user. The user then inputs the parameters of one or more selection criteria, thus defining a selection rule. Next the user requests the recording of these parameters in the private data of his social network user profile.

Each parameter of a selection criterion is then transmitted during step 210 by the user's terminal to the social network server SRS, so as to be stored in a database DB associated with this social network server SRS.

The selection criterion or criteria are dependent for example on the user who is the addressee of the message to be posted and/or the user posting the message to be posted, the timeslot of posting of the message, the geographical location of the user who is the addressee and/or who is posting the message to be posted, the link in the social network between the addressee user and/or the user posting the message to be posted, etc. A default telephone line can also be designated by the user.

Figure 3:
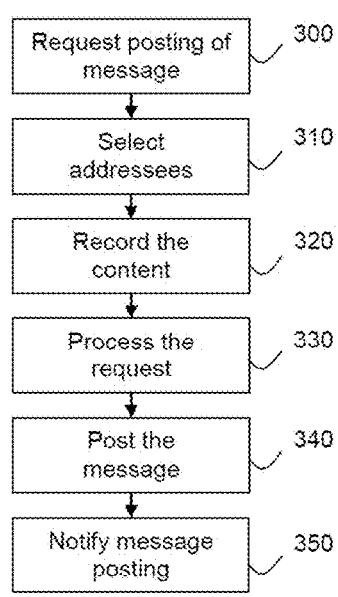
FIG. 3 is a simplified flowchart of an embodiment of the message posting request method, implemented on the user terminal side, and of the method of processing a message posting request, implemented on the messaging server and/or service platform side.

FIG. 3—Message Posting Method.

Various embodiments of a method of requesting message posting, implemented by a terminal of a user, and of a method of processing a message posting request, implemented by one or more network entities from among the social network server SRS, the messaging platform PFS and/or the messaging servers SMGF, SMGM, SMGV, are described by reference to FIG. 3.

Formulation of the Message Posting Request—Steps 300 and 310—First Embodiment with Prior Communication Setup Request In a first embodiment, the message posting request made subsequent to a setup request for telephone communication between a posting user, calling party, and at least one called user, selected from among social network users. In case of non-response of at least one called user targeted in the telephone communication setup request, the message posting request is sent automatically (step 300) by the network entity which processes the telephone communication setup request: the message posting request is dispatched for processing for example to the messaging platform PFS or directly to a messaging server. In this first embodiment, the social network user identifiers of the users who are addressees of the message to be posted are obtained by the messaging platform PFS or the messaging server: they correspond to the social network user identifiers, provided with the communication setup request, for which a non-response of the user has been detected.

Formulation of the Message Posting Request—Steps 300 and 310—Second Embodiment without Prior Communication Setup Request.

In a second embodiment, a posting user, wishing to post a message, formulates (step 300) expressly a message posting request by using a message posting request service to formulate his message posting request. Information about the message posting request is also transmitted, after, before or with the message posting request or else as constituent data of the message posting request. The message posting request and the associated information are dispatched (step 310) from a terminal of the user to the network entity which processes the message posting request: social network server SRS, messaging platform PFS or one of the messaging servers SMGF, SMGM, SMGV. This information contains in particular a social network user identifier of each user who is an addressee of the message to be posted and a social network user identifier of the posting user.

Several variants of this second embodiment are presented hereinbelow.

In a first variant of this second embodiment, the message posting request service is integrated into a social network service managed by the social network server SRS.

The posting user connects by means of his terminal to the social network server SRS to formulate his message posting request and provide the necessary information about the addressee user or users and the content of the message.

For example, the posting user connects to a Web page of the social network and formulates his request by using this Web page. In particular, he selects (step 310) the message addressee users and/or inputs the information requested: an identifier under which the posting user knows the addressee user, for example a pseudonym of the addressee users, pseudonym of the posting user to be used to perform the posting of the message, and optionally the content of the message to be posted.

In this first variant of this second embodiment, the Web page used for the formulation of the message posting request contains for example tools for searching for users in the social network. For example, a list of users of the social network is presented (step 310) to the posting user so as to prompt this user to select one or more users from this list of users. This list of users comprises for example all the users linked with the posting user through the social network, whatever the nature of the link, or else all the users linked with the posting user through the social network for whom the link with the posting user complies with a defined criterion, or all the users complying with a search criterion defined by the posting user, etc. Thus a search engine for a user in the social network can be made available on the Web page serving to define a message posting request.

When the social network user identifier provided by the posting user for one of the message addressee users is not unique (case of a pseudonym used by several users), the social network server SRS has a unique social network user identifier which identifies each of the contacts chosen as addressees of the message by the posting user and can therefore unambiguously identify these addressee users.

The social network user identifiers of the users chosen by the posting user as users who are addressees of the message to be posted are transmitted during step 310 from the user's terminal to the social network server SRS.

In this first variant of this second embodiment, the information accompanying the message posting request as formulated by the posting user, contains at least:

for the posting user, a social network user identifier (idps1, for example for the user U1) under which the posting user (U1) is known to the addressee users (the pseudonym, in general);

for each addressee user, a social network user identifier (idps2, for example for the user U2) under which this addressee user (U2) is known to the posting user (the pseudonym, in general).

The information accompanying the message posting request will thereafter be provided to the messaging server which will perform the posting of the message, in order to be stored in association with the content of the message.

Additional information is thereafter obtained by the social network server SRS in order to perform the processing of the message posting request, for example:

for the posting user, a telephone line identification (idcom1, for example for the user U1) stored in association with the social network user identifier provided in the message posting request, and, optionally, a unique social network user identifier (id1, for example for the user U1);

for each addressee user, a telephone line identification (idcom2, for example for the user U2) stored in association with the social network user identifier provided in the message posting request, and, optionally, a unique social network user identifier (id2, for example for the user U2).

In this first variant of this second embodiment, the social network server SRS receives the message posting request and the information which accompanies it and then transmits the request to the messaging platform PFS for processing. Step 330 of processing this message posting request is described in greater detail hereinbelow.

This additional information will also be provided to the messaging server which will perform the posting of the message, in order to be stored in association with the content of the message, so as in particular to process a possible request for response to the message to be posted.

In a second variant of this second embodiment, the message posting request service is performed outside of the social network. It is for example implemented by means of a Web page of a Web server SRW, managing a Web domain distinct from that of the social network. It may involve a Web server, offering a message posting service for the users of one or more social networks. This Web server SRW is then linked via the Internet network RI to the messaging platform PFS, so as to transmit to this platform a message posting request formulated by a user via a Web page.

As an alternative, instead of using a Web server SRW, the user who wishes to post a message loads a software application onto his terminal: this application is designed to communicate through the Internet network RI with the messaging platform PFS so as to transmit to this platform a message posting request formulated by a user.

In this second variant of this second embodiment, the posting user therefore connects to the messaging platform PFS by means of a terminal, by using a software application on his terminal or by passing through an intermediate Web server SRW, and then this user formulates his message posting request. For example, he inputs the information requested: an identifier under which the posting user knows the addressee user, for example a pseudonym of the addressee users, pseudonym of the posting user to be used to perform the posting of the message, and optionally the content of the message to be posted. The identification of the social network relative to which the pseudonyms are defined may also be requested thereof, when the application and the Web server SRW are used for several social networks.

In this second variant of this second embodiment, the Web page or the software application used for the formulation of the message posting request may also contain tools for searching for users in one or more social networks. As in the first embodiment, the posting user is prompted to select one or more users from a list of users of the social network. The messaging platform PFS or the Web server SRW used for the formulation of the message posting request will in this second embodiment be linked to the social network server SRS or to an associated database DB so as to have access to a list of users of the social network and to construct a list of users of the social network to be presented to the posting user.

When the social network user identifier provided by the posting user for one of the message addressee users is not unique (case of a pseudonym used by several users), data for authenticating the posting user in the social network will then be requested from the posting user, and then transmitted by the messaging platform PFS to the social network server SRS for identification of this posting user. It will then be possible to identify users of the social network who are in contact with this posting user in the social network and to identify unequivocally the addressee users selected by this user, even though this entails requesting the user to specify his choice if several addressee users with the same pseudonym are in contact with the posting user via the social network.

The social network user identifiers of the users chosen by the posting user as users who are addressees of the message to be posted are transmitted during step 310 from the user's terminal to the messaging platform PFS.

In this second variant of this second embodiment, the information accompanying the message posting request as formulated by the posting user contains at least:
  for the posting user, a social network user identifier (idps1, for example for the user U1) under which the posting user (U1) is known to the addressee users (the pseudonym, in general);
  for each addressee user, a social network user identifier (idps2, for example for the user U2) under which this addressee user (U2) is known to the posting user (the pseudonym, in general).

The messaging platform PFS is designed to communicate with the social network server SRS, or a database DB associated with this server, so as to obtain additional information, in particular the telephone line identifications for which message postings will be controlled by the messaging platform PFS.

This additional information contains:
  for the posting user, a telephone line identification (idcom1, for example for the user U1) stored in association with the social network user identifier provided in the message posting request, and, optionally a unique social network user identifier (id1, for example for the user U1);
  for each addressee user, a telephone line identification (idcom2, for example for the user U2) stored in association with the social network user identifier provided in the message posting request, and, optionally a unique social network user identifier (id2, for example for the user U2).

In this second variant of this second embodiment, when the intermediate Web server SRW or the application receives the message posting request and the information accompanying it, it transmits all these data to the messaging platform PFS for processing of the message posting request by this platform. Step 330 of processing this message posting request is described in greater detail hereinbelow.

This additional information will also be provided to the messaging server which will perform the posting of the message, in order to be stored in association with the content of the message, so as in particular to process a possible request for response to the message to be posted.

In a third variant of this second embodiment, the message posting request service is integrated into a messaging service of a telephone network operator. The user connects to this service by means of a telephone terminal. In contradistinction to the first and second embodiment described hereinabove, where the messaging platform PFS receives and processes the message posting request, it is therefore here directly a messaging server SMGF, SMGM or SMGV which receives the message posting request and processes it.

The posting user connects by means of his terminal to the messaging server so as to formulate his message posting request and provide the necessary information about the addressee user or users and the content of the message.

For example, the posting user connects to a voice server forming part of the messaging server, and then provides the requested information vocally: an identifier under which the posting user knows the addressee user, for example a pseudonym of the addressee users, pseudonym of the posting user to be used to perform the posting of the message, voice content of the message to be posted. The identification of the social network relative to which the pseudonyms are defined may also be requested thereof.

The voice server then interrogates the social network server SRS or an associated database DB so as to identify, from among the users of the social network who have connections with the posting user, that or those whose pseudonym, such as stored in the user profile, resembles, after vocalization, that or those pronounced by the user. The voice server then returns a voice stream containing the vocalized pseudonym or pseudonyms for which a resemblance has been found. Next the user validates his choice of addressee user by confirming or denying, for example by tapping a button, causing for example DTMF signals to be sent, or by pronouncing keywords ("yes" or "no").

In this third variant of this second embodiment, the information accompanying the message posting request as formulated by the posting user contains at least:
  for the posting user, a social network user identifier (idps1, for example for the user U1) under which the posting user (U1) is known to the addressee users (the pseudonym, in general);
  for each addressee user, a social network user identifier (idps2, for example for the user U2) under which this addressee user (U2) is known to the posting user (the pseudonym, in general).

The social network user identifiers of the users chosen ultimately by the posting user as users who are addressees of the message to be posted are obtained during step 310 by the messaging server.

In this third variant of this second embodiment, the messaging server which receives the message posting request and the information accompanying it, processes the message posting request directly, without passing through the messaging platform PFS.

When the social network user identifier provided by the posting user for one of the message addressee users is not unique (case of a pseudonym used by several users), data for authenticating the posting user in the social network will then be requested from the posting user, and then transmitted to the social network server SRS for identification of this posting user. It will then be possible to identify users of the social network who are in contact with this posting user in the social network and to identify unequivocally the addressee users selected by this user, even though this entails requesting the user to specify his choice if several addressee users of the same pseudonym are in contact with the posting user.

The messaging server SMGF, SMGM or SMGV will therefore have to interrogate, directly or by passing through the messaging platform PFS, the social network server SRS or an associated database DB, to obtain the information about the identifications of the telephone lines stored in association with each social network user identifier used in the message posting request, in particular to identify the mailbox or boxes that will have to store the message to be posted.

This following information, obtained by the messaging server SMGF, SMGM or SMGV in order to perform the processing of the message posting request, thus contains:

for the posting user, a telephone line identification (idcom1, for example for the user U1) stored in association with the social network user identifier provided in the message posting request, and, optionally a unique social network user identifier (id1, for example for the user U1);

for each addressee user, a telephone line identification (idcom2, for example for the user U2) stored in association with the social network user identifier provided in the message posting request, and, optionally a unique social network user identifier (id2, for example for the user U2).

This additional information will be stored in association with the content of the message, so as in particular to process a possible request for response to the message to be posted.

In this third variant of this second embodiment, it is therefore a messaging server which receives and processes the message posting request and the information accompanying it. Step 330 of processing this message posting request is described in greater detail hereinbelow.

Recording of the Content of the Message to be Posted—Step 320

The network entity (either the messaging platform PFS, or a messaging server SMGF, SMGM or SMGV) which receives and processes the message posting request is in charge of obtaining the data of the content of the message to be posted as well as the information to be recorded in association with this message to be posted.

The information to be recorded comprises in particular a social network user identifier of the user posting the message to be posted and a social network user identifier of the user who is the addressee or the users who are the addressees of the message to be posted. This information is provided in text or voice form, or indeed in image form, to the messaging server SMGF, SMGM or SMGV which performs the message posting: it will be used to notify the message addressee user or users of the posting of the message.

The additional information, to be recorded in association with this message to be posted (telephone line identifications, and, optionally, the unique social network user identifiers), are provided in character string form to the messaging server SMGF, SMGM or SMGV that performs the message posting. This additional information is not known to the posting user and/or to the message addressee users and is not accessible to them: it is therefore stored by the messaging server without ever being communicated to a user.

Step 320 of recording the content of the message can be performed before or after or simultaneously with steps 300 and 310 of formulating the message posting request and of dispatching the information accompanying it.

Concerning the recording of the content (text, voice or picture) of the message, several embodiments are possible.

In a first embodiment, usable when the network entity which receives the message posting request is the messaging platform PFS, the content of the message is recorded in a memory of the terminal of the posting user and a data file incorporating this content is transmitted by this terminal to the social network server SRS which retransmits it to the messaging platform PFS, or else is transmitted by this terminal directly to the messaging platform PFS.

In a second embodiment, particularly suitable when the network entity is a messaging server (SMGF, SMGM or SMGV) the data of the content of the message are generated on the terminal (for example, with a microphone and sound capture software), and the data stream thus captured is transmitted in real time to this network entity to be recorded by this network entity in a memory of this network entity.

Reception and Processing of the Message Posting Request—Step 330

The network entity which receives a message posting request is the social network server SRS and/or the messaging platform PFS and/or a messaging server SMGM, SMGF and SMGV. These network entities can in particular cooperate to perform this processing.

This network entity receives a request for posting of a message intended for at least one addressee user, a social network user, who is identified by means of at least one social network user identifier accompanying the message posting request. The posting user is also identified by means of a social network user identifier.

This network entity also obtains, for each user who is an addressee of the message to be posted, an identification of at least one telephone line associated with this social network user identifier, for example by interrogation of the social network server SRS.

For each addressee user, the telephone line identified is a telephone line of which an identification has been stored in association with a social network user identifier assigned to the addressee user concerned.

When several telephone lines are stored in association with a social network user identifier assigned to an addressee user, the telephone line identified is selected, for example by the social network server SRS, from among these various telephone lines as a function of at least one selection rule defined by the social network user concerned and stored by the social network server SRS. This selection rule uses for example a criterion relating to the link in the social network between the posting user and the addressee user concerned. According to another example, this criterion is a criterion relating to the message posting user.

The posting of the message in a mailbox associated with the telephone line thus identified takes place in step 340.

The following information is stored in association with the posted message:

for the posting user, a social network user identifier (idps1, for example for the user U1) under which the posting user (U1) is known to the addressee users (the pseudonym, in general) as well as a telephone line identification (idcom1, for example), stored in association with this social network user identifier;

for each addressee user, a social network user identifier (idps2, for example for the user U2) under which this addressee user (U2) is known to the posting user (the pseudonym, in general) as well as a telephone line identification (idcom2, for example), stored in association with this social network user identifier.

The information stored in association with the posted message may optionally contain:

for the posting user, his unique social network user identifier (id1, for example for the user U1);

for each addressee user, his unique social network user identifier (id2, for example for the user U2).

Finally, a notification of posting of the message is dispatched addressed to at least one terminal associated with the telephone line identified, the notification comprising a social network user identifier assigned to the posting user: the social network user identifier which is dispatched in the notification is that under which the posting user is known to the addressee users in the social network (in general, this is his pseudonym).

In the embodiments where it is a messaging server which receives the message posting request, this messaging server SMGM, SMGF and SMGV itself undertakes the posting of the message in the mailbox identified by the associated telephone line and the recording of the data provided in association with the message to be posted.

In the embodiments where it is the social network server SRS which receives the message posting request, it transmits this request to the messaging platform PFS with all the information necessary for its processing: the social network user identifiers, and an identification of the telephone lines concerned. The messaging platform PFS then processes the message posting request, as in the case, described hereinbelow, where it is the messaging platform PFS which receives the message posting request.

In the embodiments where it is the messaging platform PFS which receives the message posting request, this messaging platform PFS is designed to ask for the posting of the message from a messaging server and to communicate with the various network messaging servers SMGM, SMGF and SMGV, so as to remotely control functions of these messaging servers, in particular the functions of message posting and of recording of data in association with the posted messages.

With this aim, the network messaging servers SMGM, SMGF and SMGV each exhibit a control interface, making it possible to remotely control certain functions of these messaging servers, in particular the functions of message posting and of recording of data in association with the posted messages.

This control interface is for example a software programming interface (API, Application Programming Interface), for example carried out as a Web service.

This control interface can also be implemented by a coupling module, integrating a modem for receiving telephone call notifications and establishing a telephone link.

In a known manner, for telephone lines in circuit mode, the telephone number of the telephone line of the addressee user is dialed so as to establish a telephone link with the network messaging server of this telephone line. Via this telephone link, DTMF commands and/or a telephonic stream can thereafter be transmitted to command a recording by the messaging server of a message in the mailbox of the specified telephone line on the basis of the telephone number dialed.

In other network messaging services, a telephone link is established with the messaging server by dialing a telephone number dedicated to the messaging service. Next the telephone number of the telephone line of the addressee user is dialed so as to select the message addressee mailbox. Finally, the recording of the message in the mailbox of this addressee user takes place by dispatching of the data of the message via the telephone link thus established.

In the case of network telephone messaging, the message is recorded in the network messaging server, in the mailbox of the telephone line: the recorded message can thereafter be listened to by establishing a telephone link with this network messaging server and by listening to the audio stream transmitted through this telephone link. In the case of a fixed answering facility, the message is recorded in the answering facility and the rendering of the message can be triggered by command input on this answering facility.

In other network messaging services, for example the VoIP network RV, a link is established with the messaging server, and then an identification of the telephone line concerned in the message posting to be performed is transmitted via the link thus established.

Whatever the technology used by the network messaging services, the messaging platform PFS is connected to these messaging servers SMGM, SMGF and SMGV and is designed to control the posting of a message with at least one of these messaging servers by use of control interfaces of these servers.

The messaging platform PFS is also designed to transmit to these messaging servers, either in the actual content of the message (in voice, text and/or picture form), or as data to be stored in association with the content of the message, the message posting user's social network user identifier and the message addressee user's or users' social network user identifier: these social network user identifiers will be used in particular to notify the addressee user or users of the posting of the message.

This information comprises in particular a social network user identifier of each of these users, for example the pseudonym of each of these users. This information will thereafter be used for the notification of the posting of the message in a mailbox and/or for the rendering of the message and/or for the response to a posted message.

When the pseudonyms of the users posting and who are addressees of a posted message are unique and each make it possible to identify a social network user unequivocally, it is not necessary to also store, in association with the posted message, a unique identifier for each of these users. In the converse case, a unique social network user identifier will be stored in addition to the pseudonym of each user so as to enable subsequent access to information about each of these users, for example by interrogating the social network server SRS: in particular in order to obtain on the basis of this unique identifier a telephone line identification declared by a social network user in the data of his user profile, for a telephone line to be used for message posting.

In one embodiment, when the messaging server receiving the message to be stored is not designed to store information about the user posting a message, other than a telephone number of the posting user, the messaging platform PFS vocalizes the pseudonym of the posting user (or indeed that of the addressee user) and generates an audio message content integrating both the actual message and an introduction to this message containing the social network user identifier in vocalized form. This introduction is for example a phrase of the type "message from X" and/or "message for Y", where X, Y are respectively the pseudonyms of the posting and addressee users. The audio message content thus constructed is intended to be rendered in its entirety at each addressee user.

The messaging platform PFS is also designed to transmit to these messaging servers, as data to be stored in association with the content of the message, the telephone line identification associated with the posting user and a telephone line identification associated with each addressee user, and, optionally, the message posting user's unique social network user identifier and the message addressee user's or users' unique social network user identifier.

As a supplement, so as to allow the messaging platform PFS to process a request for posting of a response message, in response to a message whose posting request it has processed, the messaging platform PFS stores for each message posting request (or response message request), the following information:
- the message posting user's social network user identifier and the message addressee user's or users' social network user identifier,
- the telephone line identification associated with the posting user and a telephone line identification associated with each addressee user,
- and, optionally, the message posting user's unique social network user identifier and the message addressee user's or users' unique social network user identifier.

Notification of the Posting of the Message in a Mailbox—Step 350

The network messaging servers SMGM, SMGF and SMGV each exhibit a notification module for notifying, each addressee user, of a message of the posting of this message in the mailbox associated with a telephone line.

In a known manner, this notification is usually manifested in the case of a mobile network by the triggering of a telephone call on the associated telephone line (call of a voice messaging server, which offers consultation of the posted message or messages) and/or by a message dispatch, for example by a short message dispatch (SMS, Short Message Service), to the terminal or one of the terminals associated with the telephone line. In the case of a fixed answering facility, the notification is usually manifested by a luminous signal on the answering facility to signal the recording of a new message in this answering facility.

In the message posting method according to the invention, it is furthermore envisaged to inform the user who is the addressee of a message as to the identity of the posting user and/or optional other users who are addressees of the message posted by means of a social network user identifier associated with respectively one of these users. The social network user identifier can be included in voice form in a voice notification and/or in the actual content of the message if this message is a voice message. As an alternative or as a supplement, this social network user identifier can also be dispatched in textual form in the notification of message posting when this notification is a notification in text format (SMS in particular).

Other notification procedures are also applicable, for example application-based notifications, received and processed by a dedicated software application implemented on the terminal receiving the notification.

As a supplement, or as an alternative to a notification sent by the network messaging server SMGM, SMGF and SMGV, the service platform PFS dispatches a notification to at least one terminal associated with the telephone line of each message addressee user. This message is for example a short message (Short Message Service, SMS) with an identification of this service platform PFS (for example, a specific short number identifying the message sending entity and/or a commercial name of the message posting service integrated into the body of the short message) and/or a message content which indicates the identifiers of the posting and/or addressee users. The body of the short message contains for example the following sentence: "The orange messaging service is alerting you to the posting in your mailbox of a message from "idps1"; dial 888 to consult this message".

Exemplary Embodiment of the Message Posting Method

The posting user U1 formulates a request for posting of a message M1 addressed to the addressee users U2 and U4. Accordingly, the user U1 connects to a specific Web page of the social network RS: the user U1 uses his terminal TA and establishes by means of this terminal TA a connection with the social network server SRS.

The terminal TA receives a Web page that it displays on a screen of this terminal TA. This page comprises a list of users of the social network, preferably of the users known to the user U1 and/or having connections with this user U1 through the social network: these users are identified in this list by their pseudonym.

The user U1 selects the users who are to be the addressees of the message to be posted: in this instance the users U2 and U4, that U1 knows under their pseudonym idps2 and idps4.

Next the user U1 enters the message M1 to be posted. This message can be a text message, that the user U1 inputs on his terminal TA in the Web page which is displayed on this terminal. This message can also be an audio and/or video file prerecorded on this terminal that the user U1 selects by means of an interface element (button, menu, etc) displayed in the Web page which is displayed on this terminal. As an alternative, the user records a text, voice and/or video message on his terminal TA.

Next the user U1 validates the message posting request: the user U1 clicks for example on a hypertext link or button which is exhibited in the Web page displayed on the terminal TA so as to trigger the dispatch and processing of the message posting request. The social network server SRS then triggers the transmission of the message posting request to the messaging platform PFS.

This message posting request contains a social network user identifier (in this instance, idps1) of the posting user U1 and a social network user identifier for each of the addressee users U2 and U4 (in this instance, idps2 and idps4).

The message posting request is furthermore accompanied by the content of the message to be posted or is followed by a transmission of this content. This content is in textual, audio and/or video form, or an arbitrary combination of these forms, according to the possibilities of the messaging server having to store the message M1.

The messaging platform PFS interrogates the social network server SRS to obtain, for each user who is an addressee of the message, an associated telephone line identification on the basis of the social network user identifier contained in the message posting request. The social network server SRS then transmits to the messaging platform PFS the telephone line identifications idcom2 and idcom4 stored in association respectively with the social network user identifiers idps2 and idps4. It is therefore assumed here that a selection rule, defined by the user U4, has led the social network server SRS to select the telephone line identifications idcom4 rather than idcom4bis.

As an alternative, instead of it being the messaging platform PFS which interrogates the social network server SRS, the social network server SRS provides these identifications of telephone lines to the messaging platform PFS as soon as it receives the formulation of the message posting request and transmits them to the messaging platform PFS.

The messaging platform PFS then connects to the messaging server of the telephone line idcom2, that is to say to the messaging server SMGM.

If the messaging server receiving the message to be posted accepts only certain forms of message, the messaging platform PFS performs a conversion of the content of the message into a form accepted by the receiving messaging server. For example, if this messaging server accepts only voice messages, the messages in textual form will be vocalized and the video content of the message to be posted will be deleted.

Ultimately, the messaging platform PFS commands the posting of a message with the messaging server SMGM, in the mailbox associated with the telephone line idcom2.

The messaging server SMGM stores the message M1, in particular the content of this message, and stores in association the following information:

- for the posting user U1, a social network user identifier (idps1) under which the posting user U1 is known to the addressee users, a telephone line identification (idcom1), stored in association with this social network user identifier, and, optionally a unique social network user identifier (id1);
- for each addressee user U2, U4, a social network user identifier (idps2, idps4) under which these addressee users are known to the posting user, a telephone line identification (idcom2, idcom4), stored in association with this social network user identifier, and, optionally a unique social network user identifier (id2, id4).

The messaging server SMGM thereafter dispatches a notification of message posting to the telephone T2 associated with the line idcom2: this notification is manifested through a call of the voice server of the messaging of the mobile network RM. The voice message transmitted by the voice server contains in voice form the social network user identifier of the posting user U1, or indeed also that of the other addressee user U4.

In an alternative, the messaging platform PFS dispatches as a supplement to the notification sent by the messaging server a notification message in the form for example of a short message (Short Message Service, SMS) containing in textual form the social network user identifier of the posting user U1, or indeed also that of the other addressee user U4. The body of the short message contains for example the following sentence: "The orange messaging service is alerting you to the posting in your mailbox of a message from "idps1"; dial 888 to consult this message".

Next the messaging platform PFS connects to the messaging server of the telephone line idcom4, that is to say to the messaging server SMGM.

If the messaging server receiving the message to be posted accepts only certain forms of message, the messaging platform PFS performs a conversion of the content of the message into a form accepted by the receiving messaging server. For example, if this messaging server accepts only voice messages, the messages in textual form will be vocalized and the video content of the message to be posted will be deleted.

Next the messaging platform PFS commands the posting of a message with the messaging server SMGM, in the mailbox associated with the telephone line idcom4. The messaging server SMGM dispatches a notification of message posting to the telephone T4 associated with the line idcom4: this notification is manifested through a call of the voice server of the messaging of the mobile network RM. The voice message transmitted by the voice server contains in voice form the social network user identifier of the posting user U1, or indeed also that of the other addressee user U2. The user U4 is notified in the same manner as the user U2.

Figure 4:
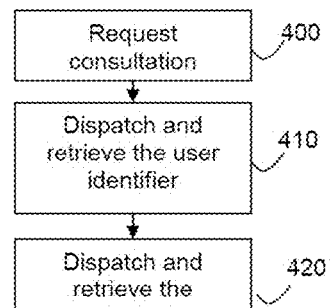
FIG. 4 is a simplified flowchart of an embodiment of the message consultation method, implemented on the user terminal side, and of the method of processing a message consultation request, implemented on the messaging server and/or service platform side.

FIG. 4—Consultation of a Roosted Message

Various embodiments of a method of requesting message consultation, implemented by a terminal of a user, and of a method of processing a message consultation request, implemented by one or more network entities from among the social network server SRS, the messaging platform PFS and/or the messaging servers SMGF, SMGM, SMGV, are described by reference to FIG. 2.

Message Consultation Request of a Consulting User—Step 400

A user who is the addressee of a message can, in a known manner, consult and/or listen to and/or view the content of the message which is posted in his mailbox.

A message consultation request is formulated (step 400) by the user and received (step 400) by a network messaging server or a fixed answering facility.

When the message is posted with the telephone answering facility storing the messages of a mailbox of a telephone line, consultation of the message is performed by using this answering facility, for example actuation of a dedicated key, triggering the rendering of all the stored messages (or only of the messages not yet consulted) in this telephone answering facility.

When the message is posted with a network messaging server, the consultation of the message requires the establishment of a communication link between this network messaging server and a terminal. If the network messaging server relates to voice messaging for a telephone line, the communication link will be a telephone link and a bidirectional audio stream will be transmitted through this communication link between the messaging server and the terminal used to establish the communication link. If the network messaging server relates to Web messaging for a VoIP telephone line, the communication link will be able to be an IP link and an audio stream will be transmitted through this communication link to the terminal used to establish the communication link.

Within the framework of the invention, the messages being stored in association with a social network user identifier for the message posting user and for the message addressee user or users, new possibilities of message consultation are offered to the users. These new possibilities relate in particular to the possibility of selecting messages to be consulted and/or of defining the order in which the messages selected will be rendered. The social network user identifiers of the posting or addressee users stored with a message can in particular serve as criterion for selecting or sorting messages facilitating the consultation of the messages.

For example, the user has interaction means (telephone keys triggering dispatch of DTMF signals to a voice messaging server, or else elements of user interface in a Web page for a Web server triggering the dispatching of a Web query, or else again a button on a telephone answering facility, etc) with the messaging server to formulate and specify his message consultation request by selecting the message or messages that he wishes to consult.

With this aim, the user may have to provide, with his consultation request, a social network user identifier serving to identify the message or messages forming the subject of the consultation request and/or the order in which these messages must be presented to the consulting user.

According to a first example, the message consultation request relates to at least one message posted by a social network user of which a social network user identifier is specified by the social network user from whom the message consultation request originates.

According to a second example, the message consultation request relates to a plurality of messages to be rendered successively according to an order specified by the social network user from whom the message consultation request originates. The specified order can indicate for example that the messages will be sorted on the basis of the posting user's social network user identifier, in alphabetic order of identifier.

According to a third example, the message consultation request relates to at least one message addressed to a social network user of which a social network user identifier is specified by the social network user from whom the message consultation request originates.

All the combinations of these various examples are conceivable.

Consequently, subsequent to the establishment of the communication link with the messaging server, this messaging server receives a message consultation request originating from a terminal of a consulting user and identifies on the basis of this request at least one message posted by or addressed to this consulting user, by means of a method of message posting and/or by means of a method of response to a message such as described in this document. The messaging server thereafter undertakes the rendering of at least a part of the content of at least one identified message.

When the consultation request relates to a plurality of messages, and an order of rendering has been specified by the user, the messaging server undertakes the rendering of these messages in the specified order.

Accordingly, the messaging server sends to the consulting user's terminal, through the communication link established, a data stream containing at least a part of the content of at least one of the messages of said plurality of messages in accordance with the specified order. The terminal receives the data stream and undertakes the local rendering of the sound, of the video and/or of the text contained in this data stream.

Retrieval of the Social Network User Identifiers—Step 410

Furthermore, during the consultation of a message posted with a network messaging server SMGM, SMGF and SMGV, it is furthermore envisaged to inform the user who is the addressee of a message as to the identity of the posting user and/or of the possible other users who may be addressees of this message by means of the social network user identifier or identifiers stored in association with the message or messages forming the subject of the consultation request.

This social network user identifier will be able to be a pseudonym of this posting and/or addressee user so as not to disclose the real identity of this posting and/or addressee user.

With this aim, the messaging server transmits to the consulting user's terminal, through the communication link established, the social network user identifier of the posting user and/or of the user who is the addressee or users who are the addressees of each message. The terminal receives the data stream and undertakes the local rendering of this or these social network user identifiers. If a social network user identifier is transmitted to the consulting user's terminal in textual form, this identifier can be simply displayed on the consulting user's terminal or be vocalized. If a social network user identifier is transmitted to the consulting user's terminal in voice and/or visual form, this terminal can simply render the audio and/or video content that it receives so as to render this or these social network user identifiers for the consulting user.

In one embodiment, so that the message posting solution is compatible with the existing messaging systems, each social network user identifier will be able to be included in voice form in the voice content of the message recorded and then be rendered with the content of this message, for example before the actual content of this message.

The fact of informing the user who is the addressee of a message as to the identity, in the social network, of the posting and/or addressee user allows these users to connect with one another via messages by way of a mailbox, without these users having previously needed to exchange their telephone details and without prior authorizations being necessary on the part of these users to perform the sharing of these telephone details.

The telephone line identifications which are stored with a message are on the other hand never transmitted to a message addressee or posting user during the consultation of the message and intended solely for the processing of an optional response message posting request.

Ultimately, all or part of the consulted message is transmitted to the consulting user's terminal to be rendered by this terminal (step 420).

Figure 5:
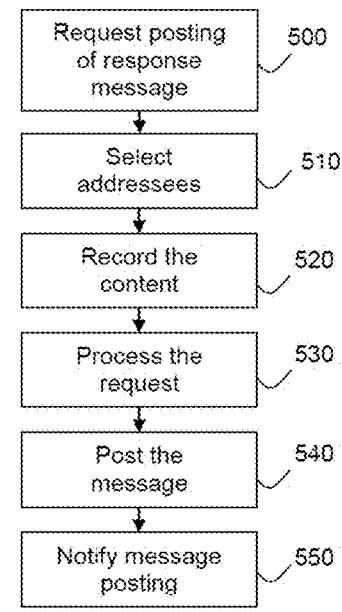
FIG. 5 is a simplified flowchart of an embodiment of the method of requesting response message posting, implemented on the user terminal side, and of the method of processing a response message posting request, implemented on the messaging server and/or service platform side.

FIG. 5—Posting of a Message of Response to an Earlier Message

Various embodiments of a method of requesting response message posting, implemented by a terminal of a user, and of a method of processing a response message posting request, implemented by one or more network entities from among the social network server SRS, the messaging platform PFS and/or the messaging servers SMGF, SMGM, SMGV, are described by reference to FIG. 2.

Each addressee user U2, U4 in respect of a message M1 posted by a user U1, called initial message, may decide to respond to this message M1 after having consulted this message, or even before having consulted this message. Consequently, the steps of the method of requesting posting of a response to a message and those of the method of processing a request for posting a response to a message are implemented before or after consultation of a message.

Furthermore, the message consultation method described hereinabove is applicable also to the messages of response to a message: each response message can be consulted according to the message consultation method described in regard to FIG. 4.

Request for Posting of a Message of Response to an Earlier Message—Step 500 and 510

To formulate a request for posting of a message of response to an earlier message (whether this earlier message be an initial message, that is to say a first message of a series of messages which is not the response of any message, or a message of response to a message), the addressee user U2 or U4 connects by means of a terminal either to the messaging server with which the earlier message was posted, or directly to the messaging platform PFS.

This user then formulates (step 500 and 510) by means of his terminal a response message posting request, in a manner identical to what was described hereinabove in regard to FIG. 3 for a request for posting of an initial message. Steps 500 and 510 therefore include respectively the characteristics of steps 300 and 310 described above.

Ultimately, a response message posting request is dispatched in step 510 from a terminal of the user to a network entity (messaging platform PFS or one of the messaging servers SMGF, SMGM, SMGV) for processing. Information about the response message posting request is also transmitted, after, before or with the response message posting request or else as constituent data of the response message posting request. This information serves to identify the user who is the addressee or users who are the addressees of the response message to be posted from among the user who is the addressee or users who are the addressees of the earlier message and the user posting the earlier message.

In contradistinction to an initial message posting where the user can choose any addressee (see step 310), the user requesting to post a response message selects (step 510) from among the posting user and the users who are addressees of the earlier message, those which will be addressees of the response message, for example on the basis of a list of users that is provided to him in a Web page or a user interface of an application or on the basis of a menu which is presented to him by the voice server that receives this request.

Furthermore, when several messages have been stored in a mailbox of the consulting user, the consulting user will have to select the message to which he wishes to respond. By default, it is the last message consulted or the message currently being consulted which will be selected as earlier message for which a response message is to be posted.

The network entity (either the messaging platform PFS, or a messaging server SMGF, SMGM or SMGV) which receives and processes the response message posting request is in charge of obtaining the data of the content of the message to be posted as well as the information to be recorded in association with this message to be posted. The information to be recorded comprises a social network user identifier of the user posting the response message to be posted, and on the other hand, a social network user identifier of the user who is the addressee or users who are the addressees of the response message to be posted. This information is provided to the messaging platform PFS in text or voice form.

When the message to be posted is a response to an earlier message, the information to be recorded in association with this message to be posted can be deduced from the information recorded with the earlier message. For example, if the user U2 requests posting of a message of response to an earlier message M1 posted by the user U1 addressed to the user U2 and U4, the user identifiers of the user posting this response message is the identifier of the user U2 recorded in association with the message M1 and the identifiers of the addressee users are the identifiers of the users U1 and U4 recorded in association with the message M1.

Just as in the case of the posting of an initial message, described in regard to FIG. 3, the network entity which receives and processes the request for posting of a message in response to an initial message, undertakes the identification of a telephone line associated with a social network user identifier assigned to the user posting the initial message.

In particular, the telephone line identified is a telephone line of which an identification has been stored in social network user profile data in association with a social network user identifier assigned to the addressee user concerned.

When several telephone lines are stored in association with a social network user identifier assigned to an addressee user, the telephone line identified is selected from among these various telephone lines as a function of a selection rule. This selection rule uses for example a criterion relating to the link in the social network between the user posting the response message and the addressee user concerned. According to another example, this selection rule uses a criterion relating to the user posting the message.

Posting of the Response Message—Steps 520 to 540

The posting of the message in a mailbox associated with the telephone line thus identified takes place next. The posting of a response message is implemented in the same manner as the posting of an initial message, such as described in regard to FIG. 3, in steps 320 to 340.

In the embodiments where a messaging server which receives the request for posting of the response message, this messaging server SMGM, SMGF and SMGV itself undertakes the posting of the message in the mailbox identified by the associated telephone line and the recording of the data provided in association with the message to be posted.

In the embodiments where it is the messaging platform PFS which receives the request for posting of the response message, this messaging platform PFS is designed to ask for the posting of the message with a messaging server and to communicate with the various network messaging servers SMGM, SMGF and SMGV, so as to remotely control, as already described for the case of the posting of an initial message, functions of these messaging servers, in particular the functions of message posting and of recording of data in association with the posted messages.

In all these embodiments, a social network user identifier of the posting user and/or of the addressee user or users is stored in association with the posted message.

It should be noted that if the earlier message was intended for several addressee users, the message of response to this earlier message may be intended only for the user posting the earlier message and not for the other addressee users, or only for some of the addressee users. In this case, the user requesting the posting of a response message provides an identification of the user or users who are addressees of his message to respond. By default, all the other users who were addressees of the earlier message will be addressees also of the response message, as well as the user posting the earlier message.

Furthermore, because it entails a posting of a message of response to an existing earlier message, a stamp is stored by the messaging platform PFS and/or by the messaging server in association with the response message to signify that this response message is a message of response to an earlier message and/or to identify the earlier message. A message identifier is for example stored with each posted message, representative of a possible earlier message whose posted message is a response, this identifier taking a specific value when the posted message is not a response message.

Thus, when a request for consultation of the response message is received, it is possible to identify the earlier message of which this response message is a response and to prompt the user consulting the response message to also consult the earlier message, even if the mailbox storing the earlier message and the response message is not the same.

A stamp can also be stored by the messaging platform PFS and/or by the messaging server in association with the earlier message to signify that a response message has been posted in respect of this earlier message and/or to identify at least one response message posted subsequently. Thus, when a request for consultation of the earlier message is received, it is possible to determine whether a response message has been posted and, in the affirmative, to prompt the user consulting the earlier message to also consult the response message.

Notification of the Posting of the Response Message—Step 550

After recording of the response message and associated information, the response message addressee user or users are notified of the posting of this response message. The procedure described hereinabove for the step 350 of notification of posting of an initial message applies in an identical manner to the case of the notification of the posting of a response message.

In the response message posting method according to the invention, it is envisaged in particular to inform the user who is the addressee of a message as to the identity of the posting user and/or of the possible other users who are addressees of the response message posted by means of a social network user identifier associated with respectively one of these users.

The social network user identifier can be included in voice form in a voice notification and/or in the actual content of the message if this message is a voice message. As an alternative or as a supplement, this social network user identifier can also be dispatched in textual form in the notification of message posting when this notification is a notification in text format (SMS in particular). Other notification procedures are also applicable.

When the user posting a response message is identified on the basis of a social network user anonymized identifier, his real identity is not communicated to the users who are the addressees of this message.

As a supplement, the notification of response message posting can contain an item of information about the fact that the posted message is a response message and/or one or more items of information about the earlier message (date and time of the message, posting user and/or addressee users) for which this response message is a response.

Case of Successive Responses to an Initial Message

The message posting method which has just been described can be used several times, in a recursive manner, to post a message of response to a response message. For reasons of limitations of message storage resources, the number of levels of messages of response to a given initial message may be limited.

On each response message posting request, the network entity which receives the request identifies a telephone line associated with a social network user identifier assigned to each social network user who is an addressee of the response message, and then asks for the posting of the response message, in a mailbox associated with the telephone line identified and a dispatching of a notification of posting of the message addressed to at least one terminal associated with the telephone line identified.

When a user requests posting of a message of response to an earlier message, he may specify which earlier message is the one for which he wishes to undertake the response message posting. In particular, if several response messages have been successively posted for one and the same initial message, either in direct response to this initial message or in response to a response message of this initial message, the user can select a message from among those stored for which he is either the posting user, or the addressee user.

Accordingly a graphical interface may be offered to allow him an intuitive depiction of the succession of response messages. Or else, a voice server may be envisaged which prompts the user with the various options and requests the user to select one by tapping a key of the terminal used for the response message posting request.

In one embodiment, the notification of posting of a response message informs each addressee user in respect of this response message as to the various message consultation possibilities which are offered to him:
  either to consult a single particular message, chosen by the addressee user, from among these various messages present in his mailbox;
  or to consult a particular message from among these various messages, and then to consult the response message or messages in respect of this message;
  or to consult a single particular message from among these various messages, and then to consult the response messages in respect of this message, doing so iteratively until the last response level
  or to consult a single particular message from among these various messages, and then to consult all the messages posted after this particular message;
  or to consult all the messages originating from a particular user and/or of which another user is addressee,
  or to browse the various messages to listen to the messages in the order that suits him.

Exemplary Embodiment of the Message Consultation Method and of the Response Message Posting Method It is assumed by way of example that a message M1 has been posted by the user U1 in several mailboxes of several addressee users U2, U4. The message M1 is stored in association with:
  the identifiers id1, idps1, idcom1 for the user U1, posting user,
  the identifiers id2, idps2, idcom2 for the user U2, addressee user,
  the identifiers id4, idps4, idcom4 for the user U4, addressee user.

In the case of response of the user U2 to a message M1 posted by the user U1, the response is stored as message M2(M1) in the mailbox of the user U1 according to one of the message posting procedures described hereinabove. The message M2(M1) is consultable by the user U1 from his mailbox. Optionally, the message M2(M1) posted by the user U2 is also consultable by the user U2 from his own mailbox, that is to say the mailbox in which the message M1 was posted.

The message M2 is stored in association with:
  the identifiers id1, idps1, idcom1 for the user U1, addressee user,
  the identifiers id2, idps2, idcom2 for the user U2, posting user,
  the identifiers id4, idps4, idcom4 for the user U4, addressee user.

Likewise, in the case of response of the user U4 to a message M1 posted by the user U1, the response is stored as message M4(M1) in the mailbox of the user U1 according to one of the message posting procedures described hereinabove. The message M4(M1) is consultable by the user U1 from his mailbox. Optionally, the message M4(M1) is consultable by the user U4 from his own mailbox.

The message M4 is stored in association with:
  the identifiers id1, idps1, idcom1 for the user U1, addressee user,
  the identifiers id2, idps2, idcom2 for the user U2, addressee user,
  the identifiers id4, idps4, idcom4 for the user U4, posting user.

In one embodiment, when the initial message M1 has several addressee users U2 and U4, the response message M2(M1) is consultable by all the addressee users U2, U4 in respect of the initial message M1, each of the addressee users being able to consult the message M2(M1) from his own mailbox. For example the user U4 is addressee user in respect of the response message M2(M1), as is the user U1.

As an alternative, the user U2 can specify, while requesting posting of the response message M2(M1), that only certain addressee users in respect of the initial message M1 will receive in their mailbox the response message M2(M1).

Although the present disclosure has been described with reference to one or more examples, workers skilled in the art will recognize that changes may be made in form and detail without departing from the scope of the disclosure and/or the appended claims.

What is claimed is:

1. A method of processing a message posting request originating from a social network user, called posting user, comprising the following acts performed by at least one network entity:
   receiving, by the at least one network entity, a request for posting of a message intended for at least one social network user, called addressee user, information associated to said message posting request comprising the message and a social network user identifier for each addressee user,
   identifying, in said at least one network entity, at least one telephone line associated in a social network with a social network user identifier of an addressee user, in response to receiving the request for posting of the message,
   posting, from said at least one network entity, said message in a phone network mailbox associated with the telephone line identified, the phone network mailbox being managed by a phone network messaging server of a phone network in which at least one terminal associated with the identified telephone line establishes telephone communications using the identified telephone line, and
   dispatching, from said at least one network entity, through the phone network, a notification to the at least one terminal associated with the identified telephone line, the notification indicating that the message is available in the phone network mailbox associated with the telephone line identified and comprising a social network user identifier assigned to the posting user.

2. The method of processing according to claim 1, in which the posting user's social network user identifier is an identifier under which the posting user is known to the addressee user in the social network and/or the addressee user's social network user identifier is an identifier under which the addressee user is known to the posting user in the social network.

3. The method of processing according to claim 1, in which the posting user's social network user identifier is an identifier, not disclosing the real identity of the posting user and/or the addressee user's social network user identifier is an identifier not disclosing the real identity of the addressee user.

4. The method of processing according to claim 1, in which the identification of the telephone line is stored in social network user profile data of this addressee user that are not accessible to the posting user through the social network.

5. The method of processing a message posting request according to claim 1, comprising storing, in association with the posted message, a social network user identifier of the posting user and of the addressee user or users.

6. The method of processing a message posting request according to claim 1, comprising storing, in association with the posted message, a telephone line identification for the posting user and the addressee user or users.

7. The method of processing a message posting request according to claim 1, in which the message posting request is received by a message posting request service which is integrated into a service of the social network to which the posting user and the addressee user belong.

8. The method of processing a message posting request according to claim 1, in which the message posting request is received by a message posting request service which is integrated into a message posting service of the phone network messaging server.

9. The method of processing a message posting request according to claim 1, comprising presenting to the posting user a list of social network users from among whom at least one addressee user is to be selected, said list being constructed on the basis of a list of users linked with the posting user in a social network.

10. The method of processing a message posting request according to claim 1, in which the telephone line identified is a telephone line of an addressee user, wherein an identification of said telephone line has been stored in association with a social network user identifier assigned to this addressee user.

11. The method of processing a message posting request according to claim 1, in which the telephone line identified is a telephone line selected from among several telephone lines of an addressee user as a function of a criterion relating to the link in the social network between the posting user and said addressee user.

12. The method of processing a message posting request according to claim 1, in which the telephone line identified is a telephone line selected from among several telephone lines of an addressee user as a function of a criterion relating to the posting user and/or said addressee user.

13. The method of processing according to claim 1, wherein:
   the at least one network entity is associated with the social network;
   the request for posting is received by the at least one network entity associated with the social network;
   the at least one telephone line is identified at the at least one network entity associated with the social network;
   the act of posting comprises sending a request from said at least one network entity associated with said social network to the phone network messaging server that the message be posted in the phone network mailbox of said phone network; and
   the notification is dispatched from the at least one network entity associated with the social network.

14. A method of processing a request for posting of a response message, the method comprising the following acts performed by at least one network entity:
   receiving by the at least one network entity:
      a request for posting of a second message, in response to a first message that originated from a social network user, called posting user, addressed to a social network user, called an addressee user, posted in a first phone network mailbox of a first telephone line,
      information associated to said request for posting the second message and comprising the second message,
   in response to receiving the request for posting the second message, the at least one network entity identifying at least one second telephone line associated in a social network with a social network user identifier assigned to the posting user of the first message,
   triggering, for at least one identified second telephone line, a posting of said second message in a second phone network mailbox associated with the second identified telephone line, the second phone network mailbox associated with the second identified telephone line being managed by a phone network messaging server of a phone network in which at least one terminal associated with the second identified telephone line establishes telephone communications using the second identified telephone line, and dispatching, from said at least one network entity, through the phone network, a notification addressed to the at least one terminal associated with the second identified telephone line, the notification indicating that the second message is available in the second phone network mailbox associated with the second identified telephone line and comprising a social network user identifier assigned to the user who requested the posting of the second message.

15. The method of processing a response message posting request according to claim 14, comprising:

receiving a request for posting of a third message, in response to the second message, identifying at least one third telephone line associated with the social network user identifier assigned to the user posting the second message, triggering, for at least one identified third telephone line, a posting of said third message in a third phone network mailbox associated with the third identified telephone line and a dispatching of a notification of posting of said third message addressed to at least one terminal associated with the third identified telephone line, the notification comprising a social network user identifier assigned to the user who requested the posting of the third message.

16. A method of requesting message posting, originating from a social network user, called posting user, the method comprising the following acts performed by at least one network entity:

dispatching, by the at least one network entity, a request for posting a message intended for at least one social network user, called an addressee user, information associated to said message posting request comprising the message and a social network user identifier for each addressee user, the dispatching, from the at least one network entity, said request triggering a posting of said message in a phone network mailbox associated with a telephone line, the mailbox being managed by a phone network messaging server of a phone network in which at least one terminal associated with the telephone line establishes telephone communications using the telephone line, an identification of the telephone line is stored in a social network in association with a social network user identifier of an addressee user, and a dispatching of a notification through the phone network to the at least one terminal associated with the telephone line, the notification indicating that the message is available in the phone network mailbox associated with the identified telephone line and comprising a social network user identifier assigned to the posting user.

17. A method of requesting posting of a response message, the method comprising:

dispatching, by at least one network entity:

a request for posting of a second message, in response to a first message that originated from a social network user, called a posting user, addressed to a social network user, called an addressee user, posted in a first phone network mailbox of a first telephone line, information associated to said request for posting the second message and comprising the second message, said request for posting triggering, for a second telephone line associated in a social network with the social network user identifier assigned to the posting user posting the first message, a posting of the second message in a second phone network mailbox associated with the second telephone line, the second phone network mailbox being managed by a phone network messaging server of a phone network in which at least one terminal associated with the second telephone line establishes telephone communications using the second telephone line, and a dispatching of a notification through the phone network to the at least one terminal associated with the second telephone line, the notification indicating that the second message is available in the second phone network mailbox associated with the identified second telephone line and comprising a social network user identifier assigned to the user who requested the posting of the second message.

18. A network entity comprising:

a computing device comprising at least one non-transitory computer-readable medium comprising instructions stored thereon and at least one processor configured by the instructions to perform acts comprising:

receiving, by the network entity, a request for posting of a first message, originating from a social network user, called a posting user, intended for at least one social network user, called an addressee user, information associated to said first message posting request comprising the first message and a social network user identifier for each addressee user, identifying, in the network entity, at least one telephone line associated in a social network with a social network user identifier of an addressee user, in response to receiving the request for posting of the first message, posting, from the network entity, said first message in a first phone network mailbox associated with the identified telephone line, the first phone network mailbox being managed by a phone network messaging server of a phone network in which at least one terminal associated with the identified telephone line establishes telephone communications using the identified telephone line, and dispatching, from the network entity, through the phone network, a notification to the at least one terminal associated with the identified telephone line, the notification indicating that the first message is available in the first phone network mailbox associated with the telephone line identified and comprising a social network user identifier assigned to the posting user.

19. The network entity according to claim 18, wherein the instructions further configure the processor to perform acts comprising:

receiving a request for posting of a second message, in response to the first message, identifying, in the network entity, at least one second telephone line associated with the social network user identifier assigned to the user posting the first message, triggering, for at least one second identified telephone line, a posting of said second message in a second phone network mailbox associated with the second identified telephone line and a dispatching of a notification of posting of said second message addressed to at least one terminal associated with the second identified telephone line, the notification comprising a social network user identifier assigned to the user who requested the posting of the second message.

20. The network entity according to claim 18 wherein the instructions further configure the processor to perform acts comprising:

receiving, originating from a terminal, a request for consultation of the first message, dispatching to said terminal a social network user identifier of the user posting the first message and at least a part of the content of the first message, said dispatching triggering a rendering by the terminal of said social network user identifier and of the part of the content.

21. A terminal comprising:

a computing device comprising at least one non-transitory computer-readable medium comprising instructions stored thereon and at least one processor configured by the instructions to perform acts comprising:

dispatching, by the terminal, a request for posting a first message, originating from a social network user, called a posting user, intended for at least one social network user, called an addressee user, information associated to said request for posting the comprising the first message and a social network user identifier for each addressee user, said dispatching triggering a posting of said first message in a first phone network mailbox associated with a telephone line, an identification of which is stored in a social network in association with a social network user identifier of the addressee user, and wherein the first phone network mailbox is managed by a phone network messaging server of a phone network in which at least one terminal associated with the telephone line establishes telephone communications using the telephone line, and a dispatching of a notification to the at least one terminal associated with the telephone line, the notification indicating that the first message is available in the phone network mailbox associated with the telephone line identified and comprising a social network user identifier assigned to the posting user.

22. The terminal according to claim 21, wherein the instructions further configure the processor to perform acts comprising:

dispatching a request for posting of a third message, in response to a second message posted in a second phone network mailbox, said request for posting a third message triggering, for a second telephone line associated with a social network user identifier assigned in the social network to the user posting the second message, a posting of the third message in a third phone network mailbox associated with the second telephone line and a dispatching of a notification through the phone network to at least one terminal associated with the second telephone line, the notification indicating that the third message is available in the third phone network mailbox associated with the identified second telephone line and comprising a social network user identifier assigned to the user who requested the posting of the third message.

23. The terminal according to claim 21, wherein the instructions further configure the processor to perform acts comprising:

dispatching a request for consultation of at least one message posted in said first phone network mailbox;

for at least one first message posted on request of a user of the social network, called posting user, receiving and rendering a social network user identifier assigned to the posting user in the social network and of at least a part of the content of the first message.

* * * * *